United States Patent Office 3,155,709
Patented Nov. 3, 1964

3,155,709
METHOD OF MAKING HYDROCARBYLPHOS-
PHONODITHIOIC ACIDS
Peter E. Newallis, Crestwood, and John P. Chupp, Kirkwood, Mo., assignors to Monsanto Company, a corporation of Delaware
No Drawing. Filed Feb. 27, 1962, Ser. No. 176,137
12 Claims. (Cl. 260—461)

This invention relates to a new and useful method of making phosphonodithioic acid esters of the formula

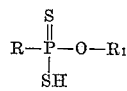

wherein R is a hydrocarbyl radical free of aliphatic unsaturation and containing 1 to 18 carbon atoms and wherein $R_1$ is a monovalent radical as exemplified by the various substituted and unsubstituted aliphatic hydrocarbon radicals, the sum total carbon atom content of $R_1$ being in the range of 1 to 18.

In accordance with this invention it has been found that the abovedescribed phosphonodithioic acid esters can be obtained in a convenient and efficient manner by reacting at least one monohydric alcohol of the formula HO—$R_1$ wherein $R_1$ has the abovedescribed significance with at least one hydrocarbylthionophosphine sulfide having a ratio of substituents of phosphorus to sulfur to hydrocarbyl radical R of approximately 1:2:1, the said hydrocarbyl radical R having the abovedescribed significance.

The hydrocarbylthionophosphine sulfide reactants of the method of this invention are in general high melting solids. They are characterized by a ratio of substituents of phosphorus to sulfur to hydrocarbyl radical R of approximately 1:2:1 and are usually represented by the broad formula $(R—PS_2)_n$ or, and preferably, by the formula

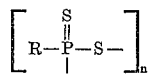

wherein $n$ is a whole number, usually less than 5, and wherein R has the aforedescribed significance, namely a hydrocarbyl radical free of aliphatic unsaturation (i.e. free of olefinic and/or acetylenic unsaturation), as for example the various alkyl, aryl, alkaryl, aralkyl, cycloalkyl, fused carbocyclic aromatic, partially and fully hydrogenated fused carbocyclic aromatic radicals, containing 1 to 18 carbon atoms, exemplary of which are methyl, ethyl, propyl, butyl, amyl, hexyl, heptyl, octyl, decyl, dodecyl, tetradecyl, octadecyl, cyclopentyl, cyclohexyl, cycloheptyl, methylcyclohexyl, cyclohexylmethyl, bicyclohexylyl, phenyl, tolyl, xylyl, cumyl, dodecylphenyl, cyclohexylphenyl, benzyl, phenethyl, phenpropyl, bibenzylyl, benzylphenyl, biphenylyl, naphthyl, tetrahydronaphthyl, anthracyl, phenanthryl, indanyl, indenyl, fluorenyl, etc., and the various isomeric forms thereof containing up to 18 carbon atoms. In general it is preferred that the "hydrocarbyl radical" be phenyl, $C_6H_5$, or an alkyl radical containing 1 to 4 carbon atoms and having at least one hydrogen substituent on the alpha carbon atom (i.e. the primary and secondary alkyl radicals as exemplified by methyl, ethyl, n-propyl, n-butyl, isopropyl, isobutyl, and sec. butyl).

These hydrocarbylthionophosphine sulfide reactants of the method of this invention are prepared by reacting hydrogen sulfide with a hydrocarbylthionophosphonic dichloride of the formula

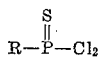

wherein R has the aforedescribed significance. This reaction is accompanied by the evolution of hydrogen chloride and therefore the overall chemical equation can be set forth as

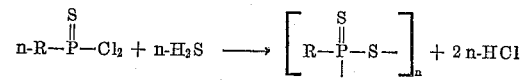

wherein $n$ is a whole number, usually less than 5, and wherein R has aforedescribed significance. The hydrocarbylthionophosphine sulfide product so produced is in many instances a mixture, the component parts of which are characterized by a ratio of substituents of phosphorus to sulfur to hydrocarbyl radical R of approximately 1:2:1 and which satisfy the formula

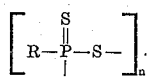

wherein R has the aforedescribed significance and wherein $n$ is a whole number, usually less than 5. Molecular weight determinations via standard ebullioscopic methods in carbon tetrachlorides indicate the hydrocarbylthionophosphine sulfide product is or is predominantly the dimeric form (i.e., $n=2$), the other forms when present usually being the trimeric (i.e., $n=3$) or the tetrameric (i.e., $n=4$) or higher polymeric forms. Each member of the mixture as well as the total mixture or any combination thereof function the same with respect to the alcohol reactant $(HO)_mR_1$ of the method of this invention.

As illustrative of the hydrocarbylthionophosphine sulfide reactants and their method of preparation is the following:

In each of the following Examples A, B, C, D, E, F, G and H the reaction vessel is a resin flask equipped with an agitator, thermometer, water-cooled reflux condenser or, and preferably for more economic use of hydrogen sulfide a Dry Ice-cooled reflux condenser, and a gas inlet tube. The gas inlet tube is connected in turn to a trap and flowmeter and thence to a hydrogen sulfide source. The outlet of the reflux condenser is connected to a safety trap and thence to a hydrogen halide scrubber. The issuing gas from the scrubber is lead to the flame of a gas burner and the unreacted hydrogen sulfide burned.

EXAMPLE A

*Methylthionophosphine Sulfide*

To the aforedescribed reaction vessel is charged approximately 972 grams of methylthionophosphonic dichloride,

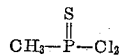

and the charge heated to the reflux temperature (about 160° C.). Hydrogen sulfide is then passed beneath the surface of the dichloride at varying rates in the range of 12 to 30 grams per hour until approximately 407 grams of hydrogen sulfide is added. During this addition the reaction temperature is maintained in the range of about 160 to 215° C. The reaction mass is cooled to room temperature, broken out of the reaction vessel, triturated under pentane, and dried in a vacuum desiccator. The yield of solid product is 98.6% of theory based on the dichloride charged. Analysis: Theory 28.2% P, 58.4% S. Found 27.5% P, 58.4% S. The molecular weight of the solid product (an average of three ebullioscopic molecular weight determinations in carbon tetrachloride) is 226. Since 220 is the theoretical molecular weight of

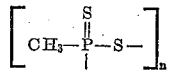

wherein $n$ is 2, the results indicate that the solid product is or is predominantly the dimeric compound (i.e. $n=2$).

EXAMPLE B

Ethylthionophosphine Sulfide

To the aforedescribed reaction vessel is charged approximately 100 grams of ethylthionophosphonic dichloride,

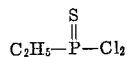

and the charge heated to approximately 175° C. Approximately 101 grams of hydrogen sulfide is then slowly passed beneath the surface of the dichloride over a period of about 11 hours. During this addition period the reaction temperature is maintained in the range of about 165 to about 220° C. The reaction mass is then cooled to room temperature, broken out of the reaction vessel, triturated under pentane, filtered and dried in a vacuum desiccator. The solid product (74.2 grams; 97.5% of theory yield based on dichloride charged) so obtained melts at 142–147° C. The molecular weight of the solid product (an average of three ebullioscopic molecular weight determinations in carbon tetrachloride over a wide range of concentrations to permit extrapolation to zero concentration) is 249. Theoretically the molecular weight of

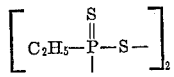

is 248 which indicates the solid product is or is predominantly the dimeric compound. Upon recrystallizing the solid product from chlorobenzene the melting point is 146–148° C. Analysis: Theory 25.0% P. Found 24.2% P.

EXAMPLE C

Isopropylthionophosphine Sulfide

To the aforedescribed reaction vessel is charged approximately 149 grams of isopropylthionophosphonic dichloride,

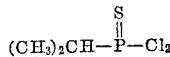

and the charge heated to approximately 170° C. Approximately 96 grams of hydrogen sulfide is passed beneath the surface of the dichloride at a rate of approximately 0.2 gram per minute. During this addition period the reaction temperature is maintained in the range of from about 170° C. to about 210° C. The reaction mass is then cooled to room temperature, broken out of the reaction vessel, washed with hexane and dried in a vacuum desiccator. The solid product (106 grams; 91.5% of theory yield based on dichloride charged) so obtained melts in the range of 160–175° C. The molecular weight of the solid product (an average of three ebullioscopic molecular weight determinations in carbon tetrachloride) is 298 which indicates it is composed largely of the dimeric compound, i.e.

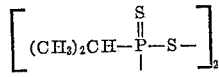

the residual components being higher polymeric forms of the dimeric compound. Upon recrystallizing the reaction product from chlorobenzene the melting point is 180–181.5° C. Analysis: Theory 22.4% P, 46.4% S. Found 21.8% P, 46.5% S.

EXAMPLE D n-Butylthionophosphine Sulfide

To the aforedescribed reaction vessel is charged approximately 250 grams of n-butylthionophosphonic dichloride,

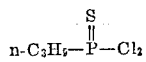

and the charge heated to approximately 170° C. Approximately 230 grams of hydrogen sulfide is then passed beneath the surface of the dichloride at a rate of approximately 0.2 gram per minute. During this addition the reaction temperature is maintained in the range of from about 170° C. The reaction mass is then cooled to room temperature, broken out of the reaction vessel, washed with hexane and dried in a vacuum desiccator. The yield is 181 grams (91% of theory based on dichloride charged). The molecular weight of the solid product (an average of three ebullioscopic molecular weight determinations in carbon tetrachloride) is 314 which indicates the product is or predominantly is the dimeric compound

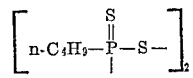

Upon recrystallizing the solid product from chlorobenzene gives a melting point of 105–110° C. Analysis: Theory 20.4% P. Found 20.2% P.

EXAMPLE E n-Propylthionophosphine Sulfide

To the aforedescribed reaction vessel is charged approximately 87 grams of n-propylthionophosphonic dichloride,

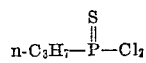

and the charge heated to approximately 170° C. Approximately 250 grams of hydrogen sulfide is then passed beneath the surface of the dichloride at a rate of about 0.2 gram per minute. During this addition the reaction temperature is maintained in the range of from about 170° C. to about 210° C. The reaction mass is then cooled to room temperature, broken out of the reaction vessel, washed with hexane and then dried in a vacuum desiccator. The solid product (68 grams; 79.5% of theory yield based on dichloride charged) so obtained melts in the range of 86–96° C. The molecular weight of the solid product (an average of three ebullioscopic molecular weight determinations in carbon tetrachloride) is 301 which indicates the product is largely the dimeric compound

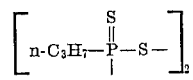

the residual components being higher polymeric forms thereof. Upon recrystallizing the solid product from chlorobenzene the melting point is 97–99° C. Analysis: Theory 22.5% P. Found 21.9% P.

EXAMPLE F

Phenylthionophosphine Sulfide

To the aforedescribed reaction vessel is charge approximately 100 grams of phenylthionophosphonic dichloride,

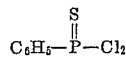

and the charge heated to approximately 235° C. Hydrogen sulfide is then passed beneath the surface of the dichloride at a rate of about 0.33 gram per minute until hydrogen chloride stops evolving. During this addition the reaction temperature is maintained in the range of from about 175 to about 235° C. The reaction mass is then cooled to room temperature and broken out of the reaction vessel, washed with hexane, and dried in a vacuum desiccator to give 70 grams of product which melts in the range of 215–232° C. The molecular weight of the solid product (an average of three ebullioscopic molecular weight determinations in carbon tetrachloride)

is 342 which indicates the solid product is or is predominantly the dimeric compound

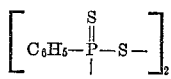

Upon recrystallizing the solid product from chlorobenzene the melting point is 233–243° C. Analysis: Theory 18.0% P, 37.2% S. Found 17.4% P, 36.62% S.

EXAMPLE G

*Cyclohexylthionophosphine Sulfide*

To the aforedescribed reaction vessel is charged approximately 49.8 grams of cyclohexylthionophosphonic dichloride,

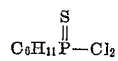

and the charge heated to approximately 200° C. Approximately 200 grams of hydrogen sulfide is then passed beneath the surface of the dichloride at a rate of about 0.2 gram per minute. During this addition the reaction temperature is maintained in the range of from 200 to 215° C. The reaction mass is then cooled to room temperature, broken out of the reaction vessel, triturated under hexane, and dried in a vacuum desiccator. The solid product (86% of theory yield based on dichloride charged) so obtained melts in the range of 138–155° C. The molecular weight of the solid product (an average of three ebullioscopic molecular weight determinations in carbon tetrachloride) is 419 which indicates that the solid product is a mixture of cyclohexylthionophosphine sulfides of the formula

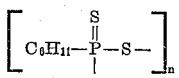

in which mixture the dimeric compound (i.e. $n=2$) predominates, the other component parts being higher polymeric forms thereof. Upon recrystallizing the solid product from chlorobenzene the melting point is 189–192° C. Analysis: Theory 17.5% P, 36.6% S. Found 17.2% P, 36.8% S.

In the preparation of several of the hydrocarbylthionophosphine sulfide reactants for the method of this invention it was found advantageous to include in the initial charge a small amount (e.g. up to about 15% by weight of the dihalide reactant charged) of the desired end product to hasten initial reaction and illustrative of such is the following:

EXAMPLE H

*Methylthionophosphine Sulfide*

To the aforedescribed reaction vessel is charged approximately 972 grams of methyl thionophosphonic dichloride,

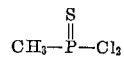

and approximately 100 grams of previously prepared methyl dithiophosphonic acid anhydride,

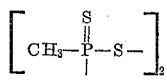

and the charge heated to 153° C. Hydrogen sulfide is then passed beneath the surface of the mass at a rate of about 0.2 gram per minute until hydrogen chloride stops evolving while maintaining the reaction mass at a temperature in the range of about 160 to 215° C. The reaction mass is then cooled to room temperature, broken out of the reaction vessel, triturated under pentane, and dried in a vacuum desiccator. The solid product (794 grams) melts in the range of 200–208° C. The molecular weight of the solid product (an average of three ebullioscopic molecular weight in carbon tetrachloride) is 235 which indicates the solid product is a mixture of materials satisfying the formula

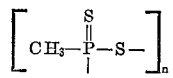

wherein $n$ averages approximately 2.15 and is composed chiefly of the dimeric compound

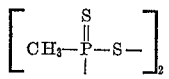

the residual components being higher polymeric forms thereof. The solid product after recrystallizing from chlorobenzene gives a melting point of 206–211° C. and analyzes as follows: Theory 28.2% P, 58.4% S. Found 27.9% P, 58.4% S.

In a similar manner employing the appropriate hydrocarbylthionophosphonic dichloride other hydrocarbylthionophosphine sulfides are prepared, e.g. 2-ethylhexylthionophosphine sulfide, laurylthionophosphine sulfide, n-octadecylthionophosphine sulfide, cyclopentylthionophosphine sulfide, p-tolylthionophosphine sulfide, n-dodecylphenylthionophosphine sulfide, benzylthionophosphine sulfide, p-biphenylylthionophosphine sulfide, 2-naphthylthionophosphine sulfide, and the like, which are operable in preparing the aforedescribed phosphonodithioic acid esters.

The hydrocarbylthionophosphine sulfides of this invention react with the monohydric alcohol reactant HO—$R_1$ in accordance with the following chemical equation

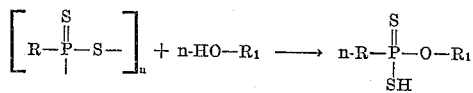

wherein $n$, R and $R_1$ have the aforedescribed significance.

It is necessary in the method of this invention that the reaction system be fluid, i.e. maintained above the freezing point of the system. In that the reaction is exothermic in general it is not necessary to apply external heat at the beginning of the reaction, however it is desirable when terminating the reaction to heat the reaction mass at a temperature in the range of from about 40° C. to about 70° C. In instances wherein the alcohol reactant is a solid it is advantageous to conduct the reaction in the presence of an inert organic solvent (e.g. benzene, toluene, xylene, hexane, heptane, octane, ethylenedichloride, carbon tetrachloride, etc.). When the alcohol reactant is a liquid and the economics permit it has been found desirable to conduct the reaction in the presence of an excess of the alcohol reactant.

For storage purposes it is convenient to convert the phosphonodithioic acid to its ammonium salt by sparging an inert solvent solution thereof with anhydrous ammonia.

The alcohol reactants of the method of this invention include a large variety of monohydric alcohols which satisfy the formula HO—$R_1$ wherein $R_1$ is a monovalent radical of the aforedescribed significance. In general the alpha-carbon atom (i.e. the carbon to which the hydroxy group is attached) of the alcohol reactants will contain at least one hydrogen substituent, that is, be a primary carbon atom (—$CH_2OH$) or a secondary carbon atom (>CHOH). The radical $R_1$ includes the various saturated and unsaturated open chain aliphatic hydrocarbon radicals both straight and branched chain and the said aliphatic hydrocarbon radicals having one or more substituents as exemplified by halogens of atomic number in the range of 18 to 80 (i.e. Cl, Br and F), aromatic hydrocarbon radicals (i.e. aryl and alkaryl radicals containing 6 to 12 carbon atoms), halogen (i.e. Cl, Br or F) substituted aromatic hydrocarbon radicals (i.e. aryl and alkaryl radicals containing 6 to 12 carbon atoms), and radicals of the formula AX— wherein X is a chalkogen of atomic weight less than 40 (i.e. S or O) and wherein A is a hydrocarbon radical (e.g. aryl, alkaryl, aralkyl, aralkenyl, cycloalkyl, cycloalkenyl, alkyl, alkenyl, alkynyl, etc. containing from 1 to 12 carbon atoms) and said hydrocarbon radical A having one or more halogen (i.e. Cl, Br and F) substituents. In general the radical A will be a lower primary aliphatic radical free of acetylenic unsaturation and composed of carbon, hydrogen and from 0 to 3 chlorine substituents (e.g. methyl, ethyl, n-propyl, n-butyl, isoamyl, allyl, methallyl, but-2-enyl, pent-2-enyl, 2-chloroethyl, 2-chloroallyl, 2,3-dichloroallyl, 2,3,3-trichloroallyl, 2,3-dichloropropyl, and the like containing up to 5 carbon atoms). As specifically illustrative the radical R is the following:

(1) The saturated aliphatic hydrocarbon radicals (i.e. alkyl) such as methyl, ethyl, propyl, butyl, amyl, hexyl, heptyl, octyl, nonyl, decyl, undecyl, dodecyl, tridecyl, tetradecyl, cetyl, octadecyl, and the various isomeric forms thereof containing up to 18 carbon atoms as exemplified by isopropyl, isobutyl, sec. butyl, isoamyl, 2-ethylhexyl, 2-octyl, diisobutyl, 2-dodecyl, etc.;

(2) The unsaturated aliphatic hydrocarbon radicals (i.e. alkenyl or alkynyl) such as allyl, methallyl, but-2-enyl, hex-3-enyl, dec-2-enyl, dodecec-4-enyl, tridec-2-enyl, octadec-9-enyl, propargyl, but-3-ynyl, hex-3-ynyl, dodec-4-ynyl, octadec-9-ynyl, etc., and the various other isomeric forms of alkenyl and alkynyl radicals containing up to 18 carbon atoms;

(3) The halogen (i.e. Cl, Br or F) substituted aliphatic hydrocarbon radicals such as 2-chloroethyl, 3-chloropropyl, 2,3-dichloropropyl, 2,3-dichlorobutyl, 3,4,4-trichloroamyl, 2,3-dichlorododecyl, 9,10-dichlorooctadecyl, 2-bromoethyl, 4-bromobutyl, 5-bromoamyl, 9-chloro-10-bromooctadecyl, 2-fluoroethyl, 2-chloroallyl, 3-chloromethallyl, 2,3,3-trichloroallyl, 4-chlorobut-2-enyl, 6-chlorodec-2-enyl, 17-chlorooctadec-9-enyl, 2-bromoallyl, 4-bromobut-2-enyl, 17-bromooctadec-9-enyl, 3-fluoroallyl, 17-fluorooctadec-9-enyl, 4-chlorobut-2-ynyl, 4-bromobut-2-ynyl, 17-chlorooctadec-2-ynyl, and the like and the various other isomeric forms of halogen substituted alkyl, alkenyl or alkynyl radicals containing up to 18 carbon atoms and usually from 1 to 3 halogen substituents which halogens can be like or unlike.

(4) The aromatic hydrocarbon substituted aliphatic hydrocarbon radicals such as benzyl, 2-phenethyl, 3-phenpropyl, cinnamyl, 4-phenbut-2-ynyl, 3-(naphth-2-yl)allyl, 4-methylbenzyl, 4-t.butylbenzyl, n-hexylbenzyl, 4-biphenylmethyl, naphth-2-ylmethyl, 3,5-dimethylbenzyl, 12-phendodecyl, 4-ethylbenzyl, 4-hexanylbenzyl, and the various other isomeric forms of aromatic hydrocarbon substituted aliphatic hydrocarbon radicals totalling up to 18 carbon atoms and wherein the aromatic substituent (i.e. aryl or alkaryl) contains from 6 to 12 carbon atoms, and their halogen (i.e. Cl, Br or F) substituted counterparts such as 4-chlorobenzyl, 4-bromobenzyl, 4-fluorobenzyl, 2,4-di- and 2,4,5-trichlorobenzyl, 3-(trifluoromethyl)benzyl, 3-(trifluoromethyl)-4-chlorobenzyl, 3-(chloromethyl)benzyl, 3-(bromomethyl)benzyl, 4,6-dichlorophenethyl, 4-(2-chloroethyl)benzyl, 1-(chloronaphthyl)methyl, 4-chlorocinnamyl, 4-(3-chlorophenyl)but-2-ynyl, ar-trichlorobiphenylylmethyl, 12-(3,4-dichlorophenyl)dodecanyl, 12-(4-chlorophenyl)dodec-2-enyl, 4-(3-bromophenyl)but-2-ynyl, and the various other isomeric forms thereof totalling up to 18 carbon atoms having halogen substituents on either the aromatic or aliphatic nuclei or both, which halogens can be like or unlike and total from 1 to 3;

(5) The ether substituted aliphatic hydrocarbon radicals such as 2-methoxyethyl, 2-ethoxyethyl, 2-isopropoxyethyl, 2-lauroxyethyl, 3-methoxypropyl, 2-phenoxyethyl, 2-(benzyloxy)ethyl, 2-phenoxyethyl 3-phenoxypropyl, 2-(naphth-2-yloxy)ethyl, 2-cyclohexyloxyethyl 2-(allyloxy)ethyl, 2-(but-2-enyloxy)ethyl, 2-(but-3-ynyloxy)ethyl, 2-(cinnamyloxy)ethyl, 2-(4-methylbenzyloxy)ethyl, 2-(4-isoamylbenzyloxy)ethyl, 4-(biphenylyloxy)butyl, 4-(4-isohexylphenoxy)butyl, 12-(ethoxy)lauryl, 16-(ethoxy)heptadecyl, 12-(phenoxy)lauryl, and the like, and the corresponding thioethers substituted aliphatic analogues such as 2-ethylthioethyl, 2-isopropylthioethyl, 2-phenylthioethyl, 2-(allylthio)ethyl, 2-(but-2-enylthio)ethyl, 2-(benzylthio)ethyl, 4-benzylthio)butyl, etc., and the corresponding halogen (i.e. Cl, Br or F) substituted ether and thioether counterparts thereof as for example 2-(2-chloroethoxy)ethyl, 2-(2-chloroallyloxy)ethyl, 2-(2,3-dichloroallyloxy)ethyl, 2-(2,3,3-trichloroallyloxy)ethyl, 3-(2-chloroallyloxy)propyl, 2-(4-chlorophenyloxy)ethyl, 12-(2-chloroethoxy)lauryl, 2-(2,3-dichloropropoxy)ethyl, 4-(3,4-dichlorobutoxy)butyl, 2-(3,4-dichlorobenzyloxy)ethyl, 2-(2-chloroethylthio)ethyl, 2-(2-chloroallylthio)ethyl, 2-(2,3-dichloroallylthio)ethyl, 2-(2,3,3-trichloroallylthio)ethyl, 3-(2-chloroallylthio)propyl, 2-(4-chlorophenylthio)ethyl, 12-(2-chloroethylthio)lauryl, 2-(2,3-dichloropropylthio)ethyl, 4-(3,4-dichlorobutylthio)butyl, 2-(3,4-dichlorobenzylthio)ethyl, and the like totalling 18 carbon atoms and usually containing from 1 to 3 halogen substituents (i.e. Cl, Br or F) which can be like or unlike, which halogen substituents can be on the aromatic or aliphatic nuclei or both.

While as aforementioned $R_1$ can have a total carbon atom content up to 18 carbon atoms in general for the preparation of a particularly useful class of pesticidal phosphonodithioates it will be either lower primary alkyl or lower primary alkenyl (e.g. methyl, ethyl, propyl, butyl, amyl, allyl, butenyl, pentenyl, and the various isomeric forms thereof containing up to 5 carbon atoms) and said radicals substituted with 1 to 3 chlorine atoms (e.g. 2-chloroethyl, 2,2-dichloroethyl, 2,3-dichloropropyl, 3,4-dichlorobutyl, 2-chloroallyl, 2,3-dichloroallyl, 2,3,3-trichloroallyl, 2,3-dichlorobut-2-enyl, 3,4-dichloropent-3-enyl and the various isomeric forms thereof containing up to 5 carbon atoms). This preferred group of radicals can be represented by the formula $$-CH_2-C_bH_{2b+1-m}Cl_m$$

wherein $b$ is a whole number from 1 to 4 and wherein $m$ is an integer from 0 to 3 nd by tha formula $$-CH_2-C_bH_{2b-1-m}Cl_m$$

wherein $b$ is a whole number from 2 to 4 and wherein $m$ is an integer from 0 to 3.

As illustrative of the process of this invention but not limitative thereof is the following:

EXAMPLE I

To a suitable reaction vessel equipped with an agitator, reflux condenser having a CaCl₂ drying tube attached, thermometer and dropping funnel is charged 44 parts by weight (0.4 equivalent) of methylthionophosphine sulfide (the product of Example H). While agitating and keeping the contents of the reaction vessel between 55° C. and 65° C., there is added dropwise from the dropping funnel, 18.4 parts by weight (0.4 mol) of anhydrous ethyl alcohol. The reaction proceeds as the alcohol is added and results in homogeneous liquid O-ethyl methylphosphonodithioic acid. To this homogeneous liquid heel is added with agitation 154 parts by weight (1.4 equivalents) of methylthionophosphine sulfide (the product of Example H). To this slurry and with agitation is added dropwise from the dropping funnel 74 parts by weight (1.61 mols) of anhydrous ethyl alcohol while maintaining the contents of the reaction vessel between 55° C. and 65° C. The reaction mixture is then agitated until all traces of solid material disappear. The contents of the reaction vessel are then vacuum treated by heating to a pot temperature of 55° C. at 5 mm. to remove excess alcohol. The residue is cooled to room temperature. The residue, a liquid (273.9 parts by weight) is O-ethyl methylphosphonodithioic acid

representing a 97% by weight yield based on the methylthionophosphine sulfide charged. The neutralization number of the acid is 360.8 (theory being 361).

187 parts by weight of O-ethyl methylphosphonodithioic acid of Example I is dissolved in 300 parts by weight of benzene, and while agitating the solution anhydrous ammonia is sparged into the solution while maintaining the mixture at room temperature. The resulting slurry is filtered. The filter cake is washed with benzene. The filter cake is then vacuum dried yielding 206 parts by weight (98.5% yield) of white crystalline ammonium O-ethyl methylphosphonodithioate. Analysis: Theory 37.0% S, 17.9% P, 8.1% N. Found 37.6% S, 17.5% P, 7.7% N.

EXAMPLE II

To a suitable reaction vessel equipped with a thermometer, agitator, reflux condenser with $CaCl_2$ drying tube attached, and dropping funnel is charged 110 parts by weight (1.0 equivalent) of methylthionophosphine sulfide (the product of Example H). Then 35.2 parts by weight (substantially 1.1 mols) of methyl alcohol is added dropwise from the dropping funnel to the reaction vessel while agitating the contents thereof. During this addition the temperature is maintained at 50–60° C. Upon completion of the alcohol addition the mass is heated until substantially all solid disappears. The reaction product is subjected to vacuum treatment at 60° C. to remove the excess methyl alcohol. Upon cooling 141.6 parts by weight of O-methyl methylphosphonodithioic acid is obtained, representing a 99.7 percent by weight yield. Assay of the crude acid as determined by acidity is 96.6%.

In a suitable vessel 100 parts by weight of the above O-methyl methylphosphonodithioic acid (0.705 mol) is dissolved in 100 parts by weight of benzene. To this solution at 25–45° C. is added with agitation anhydrous ammonia via a gas sparge. The resulting slurry is cooled to 20° C., filtered and the filter cake washed with benzene. The filter cake is then vacuum dried to give 108 parts by weight (96.4% yield) of ammonium O-methyl methylphosphonodithioate. Analysis: Theory 40.2% S, 8.8% N. Found 39.83% S, 8.43% N.

EXAMPLE III

To a suitable reaction vessel equipped with a thermometer, agitator, reflux condenser with $CaCl_2$ drying tube attached and dropping funnel is charged 110 parts by weight (1.0 equivalent) of methylthionophosphine sulfide (the product of Example H). Then 80 parts by weight (substantially 1.0 mol) of 2-chloroethanol is added dropwise from the dropping funnel to the reaction vessel while agitating the contents thereof. During this time the temperature is maintained at 50–60° C. Upon completion of the alcohol addition the mass is headed until substantially all solid disappears. Upon cooling 189 parts by weight of O-(2-chloroethyl) methylphosphonodithioic acid is obtained, representing a 99 percent by weight yield. Assay of the crude acid as determined by acidity is 98%. Theory NN 295. Found NN 292.

In a suitable vessel 2 parts by weight of the above methylphosphonodithioic acid (0.015 mol) is dissolved in 10 parts by weight of benzene. To this solution at 25–45° C. is added with agitation anhydrous $NH_3$ via a gas sparge. The resulting slurry is cooled to 20° C., filtered and the filter cake washed with benzene. The filter cake is then vacuum dried to give 2 parts by weight of ammonium O-(2-chloroethyl) methylphosphonodithioate. Analysis: Theory 30.8% S, 6.7% N. Found 31.1% S, 6.95% N.

EXAMPLE IV

To a suitable reaction vessel equipped with a themometer, agitator, reflux condenser with $CaCl_2$ drying tube attached, and dropping funnel is charged 33 parts by weight (0.3 equivalent) of methylthionophosphine sulfide (the product of Example H). Then 38.7 parts by weight (substantially 0.3 mol) of 1,3-dichloro-2-propanol is added dropwise from the dropping funnel to the reaction vessel while agitating the contents thereof. During this addition the temperature is maintained at 50–60° C. Upon completion of the alcohol addition the mass is heated until substantially all solid disappears. Upon cooling 71.5 parts by weight of O-(1,3-dichloro-2-propyl) methylphosphonodithioic acid is obtained, representing a 99.6 percent by weight yield. Assay of the crude acid as determined by acidity is 99.5%. Theory NN 235. Found NN 234.5.

In a suitable vessel 2.0 parts by weight of the above methylphosphonodithioic acid (0.00837 mol) is dissolved in 10 parts by weight of benzene. To this solution at 25–45° C. is added anhydrous $NH_3$ via a gas sparge. The resulting slurry is cooled to 20° C., filtered and the filter cake washed with more benzene. The filter cake is then vacuum dried to give 2.1 parts by weight of ammonium O-(1,3-dichloro - 2 - propyl) methylphosphonodithioate. Analysis: Theory 12.1% P, 25.0% S, 27.7% Cl. Found 12.2% P, 24.7% S, 27.1% Cl.

EXAMPLE V

To a suitable reaction vessel equipped with a thermometer, agitator, reflux condenser with $CaCl_2$ drying tube attached and dropping funnel is charged 11.0 parts by weight (0.1 equivalent) of methylthionophosphine sulfide (the product of Example H). Then 7.4 parts by weight (substantially 0.1 mol) of n-butanol is added dropwise from the dropping funnel to the reaction vessel while agitating the contents thereof. During this addition the temperature is maintained at 50–60° C. Upon completion of the alcohol addition the mass is heated until substantially all solid disappears. Upon cooling O-(n-butyl) methylphosphonodithioic acid is obtained. Analysis: Theory 16.8% P, 34.8% S. Found 16.6% P, 34.1% S.

EXAMPLE VI

To a suitable reaction vessel equipped with a thermometer, agitator, reflux condenser with $CaCl_2$ drying tube attached and dropping funnel is charged 22.0 parts by weight (0.2 equivalent) of methylthionophosphine sulfide (the product of Example H). Then 11.6 parts by weight (substantially 0.2 mol) of allyl alcohol is added dropwise from the dropping funnel to the reaction vessel while agitating the contents thereof. During this time the temperature is maintained at 50–60° C. Upon completion of the alcohol addition the mass is heated until substantially all solid disappears. The reaction product is subjected to vacuum treatment at 36° C. to remove any volatiles. The O-allyl methylphosphonodithioic acid so obtained is dissolved in 150 parts by weight of benzene. To this solution at 25–45° C. is added anhydrous $NH_3$ via a gas sparge. The resulting slurry is cooled to 20° C., filtered and the filter cake washed with more benzene. The filter cake is then vacuum dried to give 20.0 parts by weight of ammonium O-allyl methylphosphonodithioate.

EXAMPLE VII

To a suitable reaction vessel equipped with a thermometer, agitator, reflux condenser with $CaCl_2$ drying tube attached, and dropping funnel is charged 55 parts by weight (0.5 equivalent) of methylthionophosphine sulfide (the product of Example H). Then 54 parts by weight (substantially 0.5 mol) of benzyl alcohol is added dropwise from the dropping funnel to the reaction vessel while agitating the contents thereof. During this time the temperature is maintained at 50–60° C. Upon completion of the alcohol addition the mass is heated until substantially all solid disappears. Upon cooling 108.5 parts by weight of O-benzyl methylphosphonodithioic acid is obtained, representing a 99.5% by weight yield. Assay of the crude acid, as determined by acidity is 96%. Theory NN 257. Found NN 248.

In a suitable vessel 73.3 parts by weight of the above crude thio acid (0.336 mol) is dissolved in 350 parts by weight of benzene. To this at 25–45° C. is added anhydrous $NH_3$ via a gas sparge. The resulting slurry is cooled to 20° C., filtered and the filter cake washed with benzene. The filter cake is then vacuum dried to give 75 parts by weight of ammonium O-benzyl methylphosphonodithioate. Analysis: Theory 12.9% P, 26.3% S, 5.67% N. Found 13.2% P, 27.2% S, 5.9% N.

EAMPLE VIII

To a suitable reaction vessel equipped with a thermometer, reflux condenser with $CaCl_2$ drying tube attached, and dropping funnel is charged 55 parts by weight (0.5 equivalent) of methylthionophosphine sulfide (the product of Example H). Then 33 parts by weight (substantially 0.55 mol) of isopropyl alcohol is added dropwise from the dropping funnel to the reaction vessel while agitating the contents thereof. During this time the temperature is maintained at 50–60° C. Upon completion of the alcohol addition the mass is heated until substantially all solid disappears. The reaction product is subjected to vacuum treatment at 60° C. to remove the excess alcohol. Upon cooling 84.3 parts by weight of O-isopropyl methylphosphonodithioic acid is obtained, representing a 99 percent by weight yield.

In a suitable sized vessel 55.4 parts by weight of the above acid (0.326 mol) is dissolved in 350 parts by weight of benzene. To this solution at 25–45° C. is added anhydrous $NH_3$ via a gas sparge. The resulting slurry is cooled to 20° C., filtered and the filter cake washed with benzene. The filter cake is then vacuum dried to give 52 parts by weight of ammonium O-isopropyl methylphosphonodithioate. Analysis: Theory 16.6% P, 7.5% N. Found 16.3% P, 7.68% N.

EXAMPLE IX

To a suitable reaction vessel equipped with a thermometer, agitator, reflux condenser with $CaCl_2$ drying tube attached and dropping funnel is charged 66 parts by weight (0.6 equivalent) of methylthionophosphine sulfide (the product of Example H). Then 63.5 parts by weight (substantially 0.6 mol) of 2-(ethylthio)ethanol is added dropwise from the dropping funnel to the reaction vessel while agitating the contents thereof. During this time the temperature is maintained at 50–60° C. Upon completion of the alcohol addition the mass is heated until substantially all solid disappears (30–60 minutes). Upon cooling 128.8 parts by weight of O-[2-(ethylthio)ethyl] methylphosphonodithioic acid is obtained, representing a 99.4 percent yield.

In a suitable vessel 65 parts by weight of the above acid (0.301 mol) is dissolved in 350 parts by weight of benzene. To this solution at 25–45° C. is added anhydrous $NH_3$ via a gas sparge. The resulting slurry is cooled to 20° C., filtered and the filter cake washed with benzene. The filter cake is then vacuum dried to give 59 parts by weight of ammonium O-[2-(ethylthio)ethyl] methylphosphonodithioate. Analysis: Theory 13.3% P, 6.0% N. Found 13.1% P, 6.35% N.

EXAMPLE X

To a suitable reaction vessel equipped with a thermometer, agitator, reflux condenser with $CaCl_2$ drying tube attached and dropping funnel is charged 33.0 parts by weight (0.3 equivalent) of methylthionophosphine sulfide (the product of Example H). Then 37.5 parts by weight (substantially 0.3 mol) of 2-bromoethanol is added dropwise from the dropping funnel to the reaction vessel while agitating the contents thereof. During this addition the temperature is maintained at 50–60° C. Upon completion of the alcohol addition the mass is heated until substantially all solid disappears. Upon cooling 69.6 parts by weight of O-(2-bromoethyl) methylphosphonodithioic acid is obtained, representing a 98.9 percent by weight yield.

EXAMPLE XI

To a suitable reaction vessel equipped with a thermometer, agitator, reflux condenser with $CaCl_2$ drying tube attached, and dropping funnel is charged 33 parts by weight (0.3 equivalent) of methylthionophosphine sulfide (the product of Example H). Then 32.4 parts by weight (substantially 0.3 mol) of 4-chlorobutanol is added dropwise from the dropping funnel to the reaction vessel while agitating the contents thereof. During this addition the temperature is maintained at 50–60° C. Upon completion of the alcohol addition the mass is heated until substantially all solid disappears (30–60 minutes). Upon cooling 64.4 parts by weight of O-(4-chlorobutyl) methylphosphonodithioic acid is obtained, representing an 88.6 percent yield.

EXAMPLE XII

To a suitable reaction vessel equipped with a thermometer, agitator, reflux condenser with $CaCl_2$ drying tube attached, and dropping funnel is charged 11 parts by weight (0.1 equivalent) of methylthionophosphine sulfide (the product of Example H). Then 16.4 parts by weight (substantially 0.10 mol) of 2,3,3-trichloroallyl alcohol is added dropwise from the dropping funnel to the reaction vessel while agitating the contents thereof. During this addition the temperature is maintained at 50–60° C. Upon completion of the alcohol addition the mass is heated until substantially all solid disappears. Upon cooling 27.4 parts by weight of O-(2,3,3-trichloroallyl) methylphosphonodithioic acid is obtained, representing a 100 percent by weight yield. Assay of the crude acid as determined by acidity is 100%. Theory NN 206. Found NN 206.4.

In a suitable vessel 3.1 parts by weight of the above methylphosphonodithioic acid (0.0114 mol) is dissolved in 35 parts by weight of benzene. To this solution at 25–45° C. is added with agitation anhydrous ammonia via a gas sparge. The resulting slurry is cooled to 20° C., filtered and the filter cake washed with benzene. The filter cake is then vacuum dried to give 2.5 parts by weight of ammonium O-(2,3,3-trichloro-allyl) methylphosphonodithioate. Analysis: Theory 10.8% P, 22.4% S, 4.9% Cl. Found 10.3% P, 22.1% S, 5.1% N.

EXAMPLE XIII

To a suitable reaction vessel equipped with a thermometer, agitator, reflux condenser with $CaCl_2$ drying tube attached, and dropping funnel is charged 55 parts by weight (0.5 equivalents of methylthionophosphine sulfide (the product of Example H). Then 53 parts by weight (substantially 0.52 mol) of pinacolyl alcohol is added dropwise from the dropping funnel to the reaction vessel while agitating the contents thereof. During this addition the temperature is maintained at 50–60° C. Upon completion of the alcohol addition the mass is heated until substantially all solid disappears. The reaction product is subjected to vacuum treatment at 70° C. to remove the excess alcohol. Upon cooling 107.5 parts by weight of O-pinacolyl methylphosphonodithioic acid is obtained, representing a 97 percent by weight yield. Assay of the crude acid as determined by acidity is 97%. Theory NN 264. Found NN 256.

In a suitable vessel 63.5 parts by weight of the above methylphosphonodithioic acid is dissolved in 140 parts by weight of benzene. To this solution at 25–44° C. is added with agitation anhydrous ammonia via a gas sparge. The resulting slurry is cooled to 20° C., filtered and the filter cake washed with benzene. The filter cake is then vacuum dried to give 65 parts by weight of ammonium O-(pinacolyl) methylphosphonodithioate.

EXAMPLE XIV

To a suitable reaction vessel equipped with a thermometer, agitator, reflux condenser with $CaCl_2$ drying tube attached, and dropping funnel is charged 33 parts by weight (0.3 equivalent) of methylthionophosphine sulfide (the product of Example H). Then 26.4 parts by weight (substantially 0.3 mol) of neopentyl alcohol in 200 parts by weight of benzene is added dropwise from the dropping funnel to the reaction vessel while agitating the contents thereof. During this addition the temperature is maintained at 50-60° C. Upon completion of the alcohol solution addition the mass is heated until substantially all solid disappears. The reaction product is subjected to vacuum treatment at 70° C. to remove the volatiles. Upon cooling 59 parts by weight of O-(neopentyl) methylphosphonodithioic acid is obtained, representing a 99 percent by weight yield.

EXAMPLE XV

To a suitable reaction vessel equipped with a thermometer, agitator, reflux condenser with CaCl$_2$ drying tube attached, and dropping funnel is charged 44 parts by weight (0.4 equivalent) of methylthionophosphine sulfide (the product of Example H). Then 63.2 parts by weight (substantially 0.4 mol) of n-decyl alcohol is added dropwise from the dropping funnel to the reaction vessel while agitating the contents thereof. During this addition the temperature is maintained at 50-60° C. Upon completion of the alcohol addition the mass is heated until substantially all solid disappears. Upon cooling 107 parts by weight of O-(n-decyl) methylphosphonodithioic acid is obtained, representing a 100 percent by weight yield.

EXAMPLE XVI

To a suitable reaction vessel equipped with a thermometer, agitator, reflux condenser with CaCl$_2$ drying tube attached and dropping funnel is charged 60.1 parts by weight (0.546 equivalent) of methylthionophosphine sulfide (the product of Example H). Then 50.5 parts by weight (substantially 0.665 mol) of 2-methoxyethanol is added dropwise from the dropping funnel to the reaction vessel while agitating the contents thereof. During this addition the temperature is maintained at 50-60° C. Upon completion of the alcohol addition the mass is heated until substantially all solid disappears. The reaction product is subjected to vacuum treatment at 80° C. to remove the excess alcohol. The cooled residue is O-(2-methoxyethyl) methylphosphonodithioic acid. Assay of the acid as determined by acidity is 98%. Theory NN 301. Found NN 297.

EXAMPLE XVII

To a suitable reaction vessel equipped with a thermometer, agitator, reflux condenser with CaCl$_2$ drying tube attached, and dropping funnel is charged 33 parts by weight (0.3 equivalent) of methylthionophosphine sulfide (the product of Example H). Then 29.4 parts by weight (substantially 0.312 mol) of 3-chloro-n-propanol is added dropwise from the dropping funnel to the reaction vessel while agitating the contents thereof. During this addition the temperature is maintained at 50-60° C. Upon completion of the alcohol addition the mass is heated until substantially all solid disappears. Upon cooling 62.1 parts by weight of O-(3-chloropropyl) methylphosphonodithioic acid is obtained.

EXAMPLE XVIII

To a suitable reaction vessel equipped with a thermometer, agitator, reflux condenser with CaCl$_2$ drying tube attached, and dropping funnel is charged 33 parts by weight (0.3 equivalent) of methylthionophosphine sulfide (the product of Example H). Then 27 parts by weight (substantially 0.3 mol) of 3-methoxy-n-propanol is added dropwise from the dropping funnel to the reaction vessel while agitating the contents thereof. During this addition the temperature is maintained at 50-60° C. Upon completion of the alcohol addition the mass is heated until substantially all solid disappears. Upon cooling 60 parts by weight of O-(3-methoxypropyl) methylphosphonodithioic acid is obtained, representing a 100 percent by weight yield. Assay of the crude acid as determined by acidity is 99.4%. Theory NN 280. Found NN 278.

EXAMPLE XIX

To a suitable reaction vessel equipped with a thermometer, agitator, reflux condenser with CaCl$_2$ drying tube attached and dropping funnel is charged 33 parts by weight (0.3 equivalent) of methylthionophosphine sulfide (the product of Example H). Then 38.8 parts by weight (substantially 0.3 mol) of 2,3-dichloro-n-propanol is added dropwise from the dropping funnel to the reaction vessel while agitating the contents thereof. During this addition the temperature is maintained at 50-60° C. Upon completion of the alcohol addition the mass is heated until substantially all solid disappears. Upon cooling 71.5 parts by weight of O-(2,3-dichloropropyl) methylphosphonodithioic acid is obtained, representing a 99.5 percent by weight yield.

EXAMPLE XX

To a suitable reaction vessel equipped with a thermometer, agitator, reflux condenser with CaCl$_2$ drying tube attached, and dropping funnel is charged 44 parts by weight (0.4 equivalent) of methylthionophosphine sulfide (the product of Example H). Then 59.5 parts by weight (substantially 0.4 mol) of 2,2,2-trichloroethanol is added dropwise from the dropping funnel to the reaction vessel while agitating the contents thereof. During this addition the temperature is maintained at 50-60° C. Upon completion of the alcohol addition the mass is heated until substantially all solid disappears. Upon cooling 102.3 parts by weight of O-(2,2,2-trichloroethyl) methylphosphonodithioic acid is obtained, representing a 99 percent by weight yield.

EXAMPLE XXI

To a suitable reaction vessel equipped with a thermometer, agitator, reflux condenser with CaCl$_2$ drying tube attached is charged 33 parts by weight (0.3 equivalent) of methylthionophosphine sulfide (the product of Example H). Then 22.2 parts by weight (substantially 0.3 mol) of isobutyl alcohol is added dropwise from the dropping funnel to the reaction vessel while agitating the contents thereof. During this addition the temperature is maintained at 50-60° C. Upon completion of the alcohol addition the mass is heated until substantially all solids disappear. Upon cooling 54 parts by weight of O-(isobutyl) methylphosphonodithioic acid is obtained representing a 99% by weight yield.

EXAMPLE XXII

Employing the procedure of Example XXI but replacing isobutyl alcohol with an equimolecular amount of n-propyl alcohol there is obtained O-(n-propyl) methylphosphonodithioic acid as an oil. Analysis: Theory 37.7% S. Found 37.5% S.

EXAMPLE XXIII

Employing the procedure of Example XXI but replacing isobutyl alcohol with an equimolecular amount of 2-(phenoxy)ethanol there is obtained O-(2-phenoxyethyl) methylphosphonodithioic acid.

EXAMPLE XXIV

Employing the procedure of Example I but replacing methylthionophosphine sulfide with an equimolecular amount of ethylthionophosphine sulfide (the product of Example B) there is obtained O-ethyl ethylphosphonodithioic acid as an oil. Analysis: Theory 37.7% S. Found 37.6% S.

EXAMPLE XXV

Employing the procedure of Example V but replacing methylthionophosphine sulfide with an equimolecular amount of ethylthionophosphine sulfide (the product of Example B) there is obtained O-(n-butyl) ethylphosphonodithioic acid as an oil. Analysis: Theory 15.6% P. Found 15.5% P.

EXAMPLE XXVI

Employing the procedure of Example III but replacing methylthionophosphine sulfide with an equimolecular amount of isopropylthionophosphine sulfide (the product of Example C) there is obtained O-(2-chloroethyl) isopropylphosphonodithioic acid as an oil. Analysis: Theory 14.2% P. Found 14.1% P.

EXAMPLE XXVII

Employing the procedure of Example III but replacing methylthionophosphine sulfide with an equimolecular amount of n-butylthionophosphine sulfide (the product of Example D) there is obtained O-(2-chloroethyl) n-butylphosphonodithioic acid as an oil. Analysis: Theory 13.3% P. Found 13.1% P.

EXAMPLE XXVIII

Employing the procedure of Example III but replacing methylthionophosphine sulfide with an equimolecular amount of phenylthionophosphine sulfide (the product of Example F) there is obtained O-(2-chloroethyl) phenylphosphonodithioic acid.

EXAMPLE XXIX

Employing the procedure of Example I but replacing methylthionophosphine sulfide with an equimolecular amount of cyclohexylthionophosphine sulfide (the product of Example G) there is obtained O-ethyl cyclohexylphosphonodithioic acid in a 99% by weight yield. Analysis: Theory 26.5% S. Found 26.2% S. The ammonium salt of this acid melts at 167–169° C.

EXAMPLE XXX

Employing the procedure of Example I but replacing methylthionophosphine sulfide with an equimolecular amount of phenylthionophosphine sulfide (the product of Example F) there is obtained O-ethyl phenylphosphonodithioic acid in a 99% by weight yield.

EXAMPLE XXXI

Employing the procedure of Example II but replacing methyl alcohol with an equimolecular amount of propargyl alcohol and replacing methylthionophosphine sulfide with an equimolecular amount of isopropylthionophosphine sulfide there is obtained O-propargyl isopropylthionophosphonodithioic acid in a 100% yield which acid due to its instability is converted to its ammonium salt (M.P. 84–86° C.) by sparging as aforedescribed with anhydrous ammonia. Analysis (of ammonium salt): Theory 14.7% P, 6.6% N. Found 14.7% P, 6.8% N.

EXAMPLE XXXII

Employing the procedure of Example II but replacing methyl alcohol with an equimolecular amount of n-dodecyl alcohol there is obtained O-(n-dodecyl) methylphosphonodithioic acid.

EXAMPLE XXXIII

Employing the procedure of Example II but replacing methyl alcohol with an equimolecular amount of n-octadecyl alcohol there is obtained O(n-octadecyl) methylphosphonodithioic acid.

EXAMPLE XXXIV

Employing the procedure of Example II but replacing methyl alcohol with an equimolecular amount of n-octadec-9-enyl alcohol there is obtained O-(n-octadec-9-enyl) methylphosphonodithioic acid.

EXAMPLE XXXV

Employing the procedure of Example XII but replacing methylthionophosphine sulfide with an equimolecular amount of phenylthionophosphine sulfide (the product of Example F) there is obtained O-(2,3,3-trichloroallyl)-phenylphosphonodithioic acid.

EXAMPLE XXXVI

Employing the procedure of Example IX but replacing methylthionophosphine sulfide with an equimolecular amount of phenylthionophosphine sulfide (the product of Example F) there is obtained O-[2-(ethylthio)ethyl]-phenylphosphonodithioic acid.

EXAMPLE XXXVII

Employing the procedure of Example XVI but replacing methylthionophosphine sulfide with an equimolecular amount of phenylthionophosphine sulfide (the product of Example F) there is obtained O-(2-methoxyethyl)phenylphosphonodithioic acid.

EXAMPLE XXXVIII

Employing the procedure of Example VI but replacing methylthionophosphine sulfide with an equimolecular amount of phenylthionophosphine sulfide (the product of Example F) there is obtained O-allyl phenylphosphonodithioic acid.

EXAMPLE XXXIX

Employing the procedure of Example XVI but replacing 2-methoxyethanol with an equimolecular amount of 2-(allyloxy)ethanol there is obtained O-[2-(allyloxy)-ethyl] methylphosphonodithioic acid.

EXAMPLE XL

Employing the procedure of Example IX but replacing 2-(ethylthio)ethanol with an equimolecular amount of 2-(allylthio)ethanol there is obtained O-[2-(allylthio)-ethyl] methylphosphonodithioic acid.

EXAMPLE XLI

Employing the procedure of Example IX but replacing 2-(ethylthio)ethanol with an equimolecular amount of 2-(2-chloroethylthio)ethanol there is obtained O-[2-(2-chloroethylthio)ethyl] methylphosphonodithioic acid.

EXAMPLE XLII

Employing the procedure of Example XVI but replacing 2-methoxyethanol with an equimolecular amount of 2-(2-chloroethyloxy)ethanol there is obtained O-[2-(2-chloroethyloxy)ethyl] methylphosphonodithioic acid.

EXAMPLE XLIII

Employing the procedure of Example IX but replacing 2-(ethylthio)ethanol with an equimolecular amount of 2-(2-chloroallylthio)ethanol there is obtained O-[2-(2-chloroallylthio)ethyl] methylphosphonodithioic acid.

EXAMPLE XLIV

Employing the procedure of Example XVI but replacing 2-methoxyethanol with an equimolecular amount of 2-(2-chloroallyloxy)ethanol there is obtained O-[2-(2-chloroallyloxy)ethyl] methylphosphonodithioic acid.

EXAMPLE XLV

Employing the procedure of Example XII but replacing 2,3,3-trichloroallyl alcohol with an equimolecular amount of 3-chlorobut-2-enyl alcohol there is obtained O-(3-chlorobut-2-enyl) methylphosphonodithioic acid.

EXAMPLE XLVI

Employing the procedure of Example XII but replacing 2,3,3-trichloroallyl alcohol with an equimolecular amount of 3,4-dichloropent-3-enyl alcohol there is obtained O-(3,4-dichloropent-3-enyl) methylphosphonodithioic acid.

EXAMPLE XLVII

Employing the procedure of Example XII but replacing 2,3,3-trichloroallyl alcohol with an equimolecular amount of 2-chloroallyl alcohol there is obtained O-(2-chloroallyl) methylphosphonodithioic acid.

EXAMPLE XLVIII

Employing the procedure of Example III but replacing 2-chloroethanol with an equimolecular amount of 4,5,5-trichloroamyl alcohol there is obtained O-(4,5,5-trichloroamyl) methylphosphonodithioic acid.

EXAMPLE XLIX

Employing the procedure of Example IX but replacing 2-(ethylthio)ethanol with an equimolecular amount of 2-(isoamylthio)ethanol there is obtained O-[2-(isoamylthio)ethyl] methylphosphonodithioic acid.

EXAMPLE L

Employing the procedure of Example XVI but replacing 2-methoxyethanol with an equimolecular amount of 2-(isoamyloxy)ethanol there is obtained O-[2-(isoamyloxy)ethyl] methylphosphonodithioic acid.

EXAMPLE LI

Employing the procedure of Example IX but replacing 2-(ethylthio)ethanol with an equimolecular amount of 3-(allylthio)propanol there is obtained O-[3-(allylthio)propyl] methylphosphonodithioic acid.

EXAMPLE LII

Employing the procedure of Example IX but replacing 2-(ethylthio)ethanol with an equimolecular amount of 4-(2-chloroethylthio)butanol there is obtained O-[4-(2-chloroethylthio)butyl] methylphosphonodithioic acid.

EXAMPLE LIII

Employing the procedure of Example XVI but replacing 2-methoxyethanol with an equimolecular amount of 2-(2-bromoethyloxy)ethanol there is obtained O-[2-(2-bromoethyloxy)ethyl] methylphosphonodithioic acid.

EXAMPLE LIV

Employing the procedure of Example IX but replacing 2-(ethylthio)ethanol with an equimolecular amount of 2-(2-bromoallylthio)ethanol there is obtained O-[2-(2-bromoallylthio)ethyl] methylphosphonodithioic acid.

EXAMPLE LV

Employing the procedure of Example XVI but replacing 2-methoxyethanol with an equimolecular amount of 2-(3-chloroallyloxy)ethanol there is obtained O-[2-(3-chloroallyloxy)ethyl] methylphosphonodithioic acid.

EXAMPLE LVI

Employing the procedure of Example III but replacing 2-chloroethanol with an equimolecular amount of 2-fluoroethanol there is obtained O-(2-fluoroethyl)methylphosphonodithioic acid.

EXAMPLE LVII

Employing the procedure of Example VII but replacing benzyl alcohol with an equimolecular amount of 4-chlorobenzyl alcohol there is obtained O-(4-chlorobenzyl) methylphosphonodithioic acid.

EXAMPLE LVIII

Employing the procedure of Example VII but replacing benzyl alcohol with an equimolecular amount of 4-methyl-3-trifluoromethylbenzyl alcohol there is obtained O-(4-methyl-3-trifluoromethylbenzyl) methylphosphonodithioic acid.

EXAMPLE LIX

Employing the procedure of Example VII but replacing benzyl alcohol with an equimolecular amount of cinnamyl alcohol there is obtained O-cinnamyl methylphosphonodithioic acid.

EXAMPLE LX

Employing the procedure of Example IX but replacing 2-(ethylthio)ethanol with an equimolecular amount of 2-(4-chlorophenylthio)ethanol there is obtained O-[2-(4-chlorophenylthio)ethyl] methylphosphonodithioic acid.

EXAMPLE LXI

Employing the procedure of Example VII but replacing benzyl alcohol with an equimolecular amount of 2,4,5-trichlorobenzyl alcohol there is obtained O-(2,4,5-trichlorobenzyl) methylphosphonodithioic acid.

Other phosphonodithioic acids prepared in accordance with the process of this invention from the appropriate monohydric alcohol and the appropriate hydrocarbylthionophosphine sulfide include O-(2-naphthyl) n-propylphosphonodithioic acid
O-ethyl isoamylphosphonodithioic acid
O-methyl (2-ethylhexyl)phosphonodithioic acid
O-(2-chloroallyl) laurylphosphonodithioic acid
O-(2,4,5-trichlorobenzyl) phenylphosphonodithioic acid
O-(2-ethylhexyl) laurylphosphonodithioic acid
O-isopropyl n-amylphosphonodithioic acid
O-[2-(methoxy)ethyl] benzylphosphonodithioic acid
O-(4-chlorobut-2-ynyl) ($\beta$-phenethyl)phosphonodithioic acid
O-(4-isoamylthiobutyl) cyclopentylphosphonodithioic acid
O-(2-chloro-4-methoxybutyl) (2-naphthyl)phosphonodithioic acid
O-(3,4-dichlorobenzyl) tetrahydronaphthylphosphonodithioic acid
O-(2-chloroethyl) (4-biphenylyl)phosphonodithioic acid
O-(3,3-dichloroallyl) terphenylylphosphonodithioic acid
O-ethyl indanylphosphonodithioic acid
O-ethyl phenanthrylphosphonodithioic acid
O-benzyl phenylphosphonodithioic acid
O-(4-chlorobutyl) m-tolylphosphonodithioic acid
O-isopropyl (4-ethylphenyl)phosphonodithioic acid
O-(2-fluoroethyl) n-dodecylphenylphosphonodithioic acid
O-isoamyl 3,5-xylylphosphonodithioic acid and the like.

The phosphonodithioic acids described herein before are toxic to a wide variety of insects. They are also useful as intermediates for the preparation of a wide variety of insecticidal phosphonothioates. For example (1) the addition of acrylonitrile to the various free acids provides insecticidally active esters of the formula

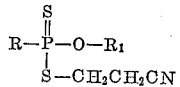

exemplary of which is O-ethyl S-(2-cyanoethyl) methylphosphonodithioate which is effectively toxic to the two spotted spider mite. *Tetranychus telarius* (L), at a concentration of 0.0004% by weight.

(2) the addition of diethyl maleate to the various free acids provides insecticidally active esters of the formula

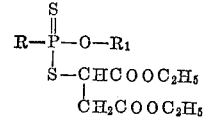

exemplary of which is 1,2-(dicarbethoxy)-2-[S-(O-methyl methylphosphonodithioate)] ethane which is effectively toxic to plum curculio, *Conotrachelus nenuphar*, at very low concentration.

(3) the reaction of a lower alkyl or alkenyl chloride with the ammonium salt of the various phosphonodithioic acid provides insecticidally active esters of the formulae

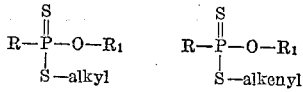

exemplary of which are O-ethyl S-allyl methylphosphonodithioate and O-(etheyl) S-n-butyl methylphosphonodithioate which exhibited control of mosquito larvae, *Aedes aegypti*, at low concentrations.

While this invention has been described with respect to certain illustrative embodiments it is to be understood that it is not so limited and that variations and modifications thereof obvious to those skilled in the art can be made without departing from the spirit or scope of this invention.

What is claimed is:

1. The method of making a phosphonothioic acid of the formula

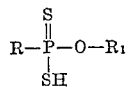

wherein R is hydrocarbyl free of aliphatic unsaturation and having up to 18 carbon atoms and selected from the group consisting of alkyl, $C_{5-7}$ cycloalkyl, methylcyclohexyl, cyclohexylmethyl, bicyclohexyl, phenyl, alkylphenyl, cyclohexylphenyl, phenylalkyl, bibenzylyl, benzylphenyl, biphenylyl, naphthyl, tetrahydronaphthyl, anthracyl, phenanthryl, indanyl, indenyl and fluorenyl, and wherein $R_1$ is selected from the group consisting of (a) aliphatic hydrocarbyl selected from the group consisting of alkyl and mono-unsaturated aliphatic hydrocarbyl selected from the group consisting of alkenyl and alkynyl, and (b) said aliphatic hydrocarbyl (a) having at least one substituent selected from the group consisting of
 (1) halogen of atomic number in the range of 18 to 80, and
 (2) aromatic hydrocarbyl having 6 to 12 carbon atoms selected from the group consisting of phenyl and alkyl substituted phenyl, and
 (3) said aromatic hydrocarbyl (2) having at least one halogen of atomic number in the range of 18 to 80 which substituent is on the aromatic nucleus thereof, and
 (4) the substituent AX— wherein X is chalkogen of atomic weight less than 40 and wherein A has from 1 to 12 carbon atoms and is selected from the group consisting of
  (4a) hydrocarbyl selected from the group consisting of alkyl, alkenyl, alkynyl, cyclohexyl, phenyl, naphthyl, biphenylyl, alkylphenyl, phenylalkyl, phenylalkenyl, and alkylphenylalkyl, and
  (4b) said hydrocarbyl (4a) having at least one halogen substituent of atomic number in the range of 18 to 80, the total carbon atom content of said $R_1$ being in the range of 1 to 18, which comprises reacting a monohydric alcohol of the formula HO—$R_1$ wherein $R_1$ has the aforedescribed significance with a hydrocarbylthionophosphine sulfide having a ratio of substituents of phosphorus to sulfur to hydrocarbyl R of approximately 1:2:1, the said hydrocarbyl R having the aforedescribed significance.

2. The method of making an alkylphosphonodithioic acid of the formula

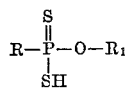

wherein R is alkly having from 1 to 4 carbon atoms and having at least one hydrogen substituent on the alpha carbon and wherein $R_1$ is of the empirical formula —$CH_2$—$C_bH_{2b+1-m}Cl_m$ wherein $b$ is a whole number from 1 to 4, wherein $m$ is an integer from 0 to 3, which comprises reacting a monohydric primary alcohol of the formula HO—$R_1$ wherein $R_1$ has the aforedescribed significance with an alkylthionophosphine sulfide of the formula

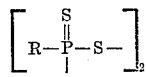

wherein R has the aforedescribed significance.

3. The method of making an alkylphosphonodithioic acid of the formula

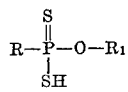

wherein R is alkyl having from 1 to 4 carbon atoms and having at least one hydrogen substituent on the alpha carbon and wherein $R_1$ is of the empirical formula

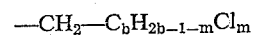

wherein $b$ is a whole number from 2 to 4 and wherein $m$ is an integer from 0 to 3, which comprises reacting a nonhydric primary alcohol of the formula HO—$R_1$ wherein $R_1$ has the aforedescribed significance with an alkylthionophosphine sulfide of the formula

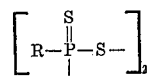

wherein R has the aforedescribed significance.

4. The method of making a methylphosphonodithioic acid of the formula

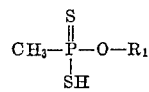

wherein $R_1$ is of the empirical formula

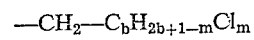

wherein $b$ is a whole number from 1 to 4 and wherein $m$ is an integer from 0 to 3, which comprises reacting a monohydric primary alcohol of the formula HO—$R_1$ wherein $R_1$ has the aforedescribed significance with

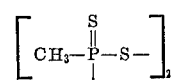

5. The method of making a methylphosphonodithioic acid of the formula

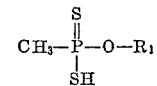

wherein $R_1$ is of the empirical formula

wherein $b$ is a whole number from 2 to 4 and wherein $m$ is an integer from 0 to 3, which comprises reacting a monohydric primary alcohol of the formula HO—$R_1$ wherein $R_1$ has the aforedescribed significance with

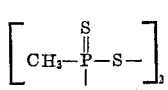

6. The method of making a phenylphosphonodithioic acid of the formula

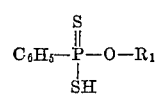

wherein $R_1$ is of the empirical formula

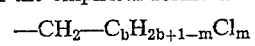

wherein $b$ is a whole number from 1 to 4, wherein $m$ is an integer from 0 to 3, which comprises reacting a monohydric primary alcohol of the formula HO—$R_1$ wherein $R_1$ has the aforedescribed significance with phenylthionophosphine sulfide of the formula

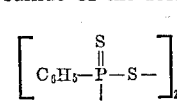

7. The method of making a phenylphosphonodithioic acid of the formula

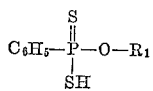

wherein $R_1$ is of the empirical formula $$-CH_2-C_bH_{2b-1-m}Cl_m$$

wherein $b$ is a whole number from 2 to 4, wherein $m$ is an integer from 0 to 3, which comprises reacting a monohydric primary alcohol of the formula $HO-R_1$ wherein $R_1$ has the aforedescribed significance with phenylthionophosphine sulfide of the formula

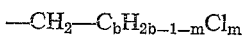

8. The method of making O-ethyl methylphosphonodithioic acid which comprises reacting ethanol with

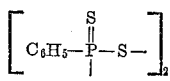

9. The method of making O-ethyl phenylphosphonodithioic acid which comprises reacting ethanol with

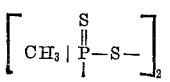

10. The method of making O-[2-(ethylthio)ethyl] methylphosphonodithioic acid and which comprises reacting 2-(ethylthio)ethanol with

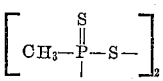

11. The method of making O-(2,3,3-trichloroallyl) methylphosphonodithioic acid which comprises reacting 2,3,3-trichloroallyl alcohol with

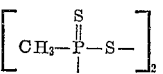

12. The method of making O-(2-chloroethyl) methylphosphonodithioic acid which comprises reacting 2-chloroethanol with

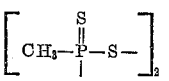

References Cited in the file of this patent

UNITED STATES PATENTS

| | | |
|---|---|---|
| 2,802,856 | Norman et al. | Aug. 13, 1957 |
| 2,841,551 | Alford | July 1, 1958 |
| 2,841,553 | Darling et al. | July 1, 1958 |
| 3,074,991 | Schrader | Jan. 22, 1963 |

FOREIGN PATENTS

| | | |
|---|---|---|
| 1,101,417 | Germany | Mar. 9, 1961 |
| 740,444 | Great Britain | Nov. 16, 1955 |